United States Patent Office 3,230,081
Patented Jan. 18, 1966

3,230,081
PROCESS FOR THE PREPARATION OF PRINTING PLATES UTILIZING ELECTROSTATIC IMAGE FORMATION TECHNIQUES

Martha Tomanek, nee Kunitzer, and Fritz Uhlig, Wiesbaden-Biebrich, Germany, assignors, by mesne assignments, to Azoplate Corporation, Murray Hill, N.J.

No Drawing. Filed July 19, 1960, Ser. No. 43,733
Claims priority, application Germany, Aug. 4, 1959, K 38,365
24 Claims. (Cl. 96—1)

It is known to produce copies by electrophotographic means in which an electrophotographic material is electrically charged, exposed under a master to light, or an episcopic image is projected thereon and the electrostatic image thereby produced is developed by dusting over with a resin powder and then fixed, e.g., by heating, so that the resin powder is irremovably anchored to the support. The electrophotographic material used for this purpose consists of a support having a reproduction coating consisting of or containing a photoconductive substance.

From electrocopies, of this type, printing plates have been prepared by treatment with a solvent. The coating is removed by the solvent from the image-free portions and the portions thus bared are, where necessary, made water-conductive by suitable treatment and the imaged portions are inked up with greasy ink so that the printing plates are suitable for the production of prints. This known process has the disadvantage that the image-bearing portions also are to some considerable extent removed by the solvent so that inadequate printing plates are obtained. Lithographic printing plates also have been prepared by the electrostatic process but these have, directly on the support, a layer of a hygroscopic substance which is coated with a photoconductive layer. However, the fact that a hygroscopic coating must first be applied is a disadvantage, as also is the fact that suspensions of inorganic photoconductors in a film-forming vehicle must be used as photoconductive coatings. Moreover, in the preparation of printing plates, the hygroscopic layer is bared in the image-free areas. This layer tends to retain fine particles of the photoconductive coating so that, when printing, prints are obtained which are not free of background.

The present invention relates to a process for the preparation of printing plates, in particular for planographic printing, by the electrophotographic process. The process, in accordance with the invention, consists of forming photoconductive coatings on electrophotographic supports which contain mixtures of organic photoconductors with compounds of lower molecular weight which are alkali-soluble, and/or alkali-soluble organic photoconductors. These coatings, after performing the known steps in electrophotographic processes, i.e., electrostatic charging, exposure to light, development and fixing, are treated with alkaline liquids which may contain water and/or organic solvents.

For the preparation of the photoconductive coatings in accordance with the invention, at least one organic photoconductor is used, e.g., aromatic polyvinyl compounds, such as polyvinyl naphthalene, polyvinyl anthracene, polyvinyl biphenyl, polyvinyl fluorene; heterocyclic polyvinyl compounds, such as polyvinyl carbazole, polyvinyl quinoline, polyvinyl furane; other high molecular aromatic compounds, such as polyacenaphthylene, polyacephenanthrene, oxadiazoles, such as 2,5-bis-(4′-(n-propylamino)-2′-chlorphenyl-(1′))-1,3,4-oxadiazole or 2,5-bis-(4′-N-ethyl-N-n-propylamino-phenyl-(1′))-1,3,4-oxadiazole; imidazolones, such as 4,5-bis-(4′-aminophenyl)-imidazolone-(2), imidazolethiones, such as 4,5-diphenyl-imidazolethione-(2); triazoles, such as 1-methyl-2,5-bis-(4′-N,N-diethylaminophenyl-(1′))-1,3,4-triazole; oxazoles, such as 2-(4′-chlorphenyl)-phenanthreno-9′,10′:4,5-oxazole; thiazoles, such as 2-(4′-dimethylaminophenly)-6-methoxybenzthiazole or 2-(4′-diethylaminophenyl)-6-dimethylaminobenzthiazole; triazines, such as 3-(4′-aminophenyl)-5,6-di-pyridyl-(2″)-1,2,4-triazine or 3-(4′-dimethylaminophenyl)-5,6-di-(4″-phenoxyphenyl)-1,2,4-triazine; and hydrazones, such as 4-dimethylaminobenzylidene-isonicotinic acid hydrazide or anthracene-9-aldehydephenyl-acetic acid hydrazone. Compounds such as 2,5-bis-(4′-dimethylaminophenyl-(1′))-1,3,4-oxadiazole, 4-dimethylaminobenzaldehyde-phenylhydrazone, 4-dimethylaminobenzylidene-benzhydrazide, 2-(4-diethylaminophenyl)-4,5-diphenylimidazole, 1-N-oxethyl-2,5-bis-(4′-diethyl-amino-phenyl-(1′))-1,3,4-triazole and 1,3,5-triphenyl-pyrazole have proved particularly suitable.

The photoconductive compounds of which some examples have been given above, are used in the photoconductor coating in association with at least one solid alkali-soluble aromatic carbocyclic or aromatic heterocyclic compound of lower molecular weight.

The following are exemplary of such compounds:

Hydroxy compounds, such as pyrocatechol, resorcinol, phloroglucinol, purpurogallin, 1,2,3,-trihydroxyanthraquinone, pyrogallol, 5-hydroxy-acenaphthene, and 2,3-dihydroxy-naphthalene;

Acid anhydrides, such as phthalic anhydride, tetrachlorophthalic anhydride and naphthalenedicarboxylic-anhydride; carboxylic acids, especially aromatic carboxylic-acids, such as aminobenzoic acids, dialkylaminobenzoic acids, alkylaminobenzoic acids, e.g. p-dimethylaminobenzoic acid, p-diethylaminobenzoic acid, p-dipropylamino benzoic acid, p-monoethylamino benzoic acid, p-aminobenzoc acid, m-aminobenzoic acid, naphthalic acid, tetrachlorophthalic acid, and anthraquinone carboxylic acid; sulfonic acids, such as 1-naphthylamine-4-sulfonic acid, naphthalene-1-sulfonic acid, 1,8-naphthosultone-3-sulfonic acid, and benzene-sulfonic acid;

Sulfonamides, such as naphthalene-1-sulfonanilide, 5-(p-toluene-sulfonamido)-acenaphthene, phenylsulfanilide, and 2-(naphthoquinone-(1,2)-diazide-(2)-sulfonamido-(5))-7-(naphthoquinone-1,2)-diazide-(2)-sulfonyloxy-(5))-naphthalene;

Sulfonimides, such as benzoic acid-o-sulfonic acid imide, and benzene-disulfonic acid-(1,2)-imide;

Imidazoles, such as 6-chloro-2-methyl-benzimidazole, 2-mercapto-benzimidazole, and 2-(α-furyl)-4,5-diphenyl-imidazole; and Triazoles such as 2,5-diphenyl-triazole-1,3,4, and 2,5-bis-(4′-chlorphenyl-(1′))-1,3,4-triazole.

Mixtures of such compounds with each other, or with resins or other materials, such as sensitizers, pigments or fillers may also be used in the formation of the photoconductor coating.

Where resins, such as maleic acid resins, phenol-formaldehyde resins, coumarone resins, ketone resins, chlorinated caoutchuc, afterchlorinated polyvinyl chloride, are incorporated in the photoconductive layer, the content of the photoconductive compound in the layer should be at least 20 percent by weight.

Photoconductors which are themselves alkali-soluble may be used alone without any additives for the formation of the coating on electrophotographic supporting material. Exemplary of such alkali-soluble photoconductors are: multinuclear aromatic sulfonamides, such as anthracene-2-sulfanilide, aromatic heterocyclic multinuclear sulfonamides, such as 2, 5-bis-(4′-toluene sulfonamidophenyl-(1′))-1,3,4-oxadiazole, aromatic heterocyclic multinuclear compounds not substituted on the nitrogen, e.g., triazoles and imidazoles, such as 2,5-bis-(4′-diethylaminophenyl-(1′))-1,3,4-triazole,
2,5-bis-(4′-di-n-propylaminophenyl-(1′))-1,3,4-triazole,
6-amino-2-(4′-amino-styryl)-benzimidazole,
2-(4′-diethylaminophenyl)-benzimidazole,
2-(4-diethylaminophenyl)-benzimidazole, and
1-methyl-2-(4′-dimethylaminophenyl)-benzimidazole.

The base materials used as supports may be any that satisfy the requirements of electrophotography, e.g., metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefins, if they are covered with an electroconductive layer or if they are converted into electroconductive materials, e.g., by chemical treatment or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$/cm.$^{-1}$, preferably higher than $10^{-10}$ ohm$^{-1}$/cm.$^{-1}$.

For the application of the reproduction coatings to the supporting materials, the photoconductive substances, are advantageously dissolved in a suitable solvent, either alone, if alkali-soluble, or in association with the alkali-soluble compounds of lower molecular weight in proportions of from 90:10 to 40:60, preferably 80:20 to 50:50, and applied thus to the supports. Coating can be effected in known manner, e.g., by spraying, painting, roller application, immersion or by whirl coating. The coating is then advantageously dried at elevated temperature.

Sensitizers, to increase the sensitivity of the reproduction coating to the visible range of the spectrum, may be added in small quantities, about 0.0001 to 0.1 percent by weight relative to the photoconductor portion of the reproduction coating, either to the solutions or by subsequent treatment after the electrocopying material has been prepared. Such sensitizers, which generally are dyestuffs, are disclosed in Belgian Patent 558,078.

The preparation of the electrocopies is in a manner known per se. The electrocopying material described above is charged in a charging device by a corona discharge and then the charged electrocopying material is exposed to light under a master by the contact process. Alternatively, an episcopic or diascopic image of the master can be projected on the material, or the material can be exposed directly in a camera. The latent electrostatic image is then developed in a known manner with the usual pigmented resin powder, which may be suspended in a non-conductive liquid, and the image which becomes visible is then fixed, e.g., by heating with an infrared radiator to about 100–170° C., preferably 120–150° C., or by treatment with solvents or steam. In this way, images resistant to abrasion are obtained which have good contrast and are resistant to alkaline solutions.

The coatings of the invention can be charged either positively or negatively. Thus, by suitable choice of polarity, either direct or reversed images can be produced with a single toner. For example, if a negative toner, as described in copending U.S. patent application Serial No. 40,518, filed July 5, 1960, now abandoned, is used, and the coating is positively charged, an image corresponding to the master is obtained because the toner is attracted to the portions no struck by light, i.e. the portions where the electrostatic charge remains. If the coating is negatively charged, the same toner produces reversed images, because in this case, as a result of the similarity of polarity, the toner is repelled from the portions which are still electrostatically charged and it settles in the portions which have been exposed to light.

For the conversion of the electrophotographic images into printing plates, these electrocopies are treated with an alkaline liquid, so that the original photoconductive coating is removed from the image-free parts and the support is bared. The image-free parts may be treated with an acid, such as phosphoric acid, to improve the hydrophilic properties thereof. The treatment for conversion to printing plates may be effected by a simple wiping-down process, e.g., with a wetted cotton pad, by immersion in a developer bath or by corresponding mechanical devices by means of which the alkaline liquid is applied, e.g., by rollers.

Solutions of inorganic and/or organic alkaline compounds in water and/or in organic solvents may be used. The inorganic alkaline compounds used may be ammonia, alkali metal and alkaline earth metal hydroxides, preferably ammonium hydroxide, sodium hydroxide and potassium hydroxide (calcium hydroxide, barium hydroxide and strontium hydroxide have also given good results), and alkali phosphates, in particular the sodium phosphates having an alkaline reaction in aqueous solution, and alkali polyphosphates, such as sodium polyphosphate. The organic basic substances may be primary, secondary and tertiary lower saturated amines, e.g., trimethylamine, ethylamine, diethylamine, triethylamine, propylamine, butylamine, isobutylamine, dibutylamine, tributylamine, diisobutylamine, octylamine and dioctylamine; piperidine, N-methyl-piperidine, N-ethyl-piperidine and morpholine; amino alcohols, such as ethanolamine, diethanolamine, triethanolamine, N-methyldiethanolamine and N-ethyldiethanolamine; diamines and polyamines, such as ethylene diamine, diethylene triamine, and triethylene-tetramine; and lower substituted acid amides, such as dimethyl formamide. The low-volatility amines or amino alcohols, in particular ethanolamine, diethanolamine and octylamine, or mixtures thereof, are preferably used.

Some of these basic compounds can be used undiluted. Generally, however, it is best, particularly in the case of the stronger bases, to use them in diluted form. Preferably, solutions of 0.01–15 percent, by weight, particularly 1–5 percent, are used. The solvent used may be water and/or organic solvents. A wide variety of organic solvents may be used. However, those which are preferred are those in which oxygen is contained in the molecule in the form of ether, ketone, alcohol or ester groups. The following are exemplary: aliphatic ethers, such as dibutylether, ethylbutylether, diisopropylether, dioxane, and tetrahydrofuran; lower ketones, such as acetone, methylethylketone, and dipropylketone; lower esters, such as methylacetate, ethylacetate, butylacetate, methylpropionate, methylbutyrate, and ethylbutyrate and, in particular, solvents containing alcohol groups such as methanol, ethanol, propanol, isopropanol, butanol, isobutanol, ethyleneglycol, polyethyleneglycol, glycerine, ethyleneglycolmonomethylether and glycerine monoethylether. The multivalent alcohols such as ethyleneglycol, glycerine, and polyethyleneglycol, and also solid polyglycols of higher molecular weight may be mentioned as particularly satisfactory. Also, mixtures of several solvents may be used.

It is also often advantageous for thickening agents to be added to the alkaline liquids, to increase the viscosity thereof. Examples of possible thickening agents are polyvinyl alcohol, cellulose products, such as carboxymethylcellulose or alkylcellulose, or soluble starch products.

Further, it can be advantageous for the fixed electrostatic image, before being treated with an alkaline liquid, to be treated with a lacquer and then to be heated for a short time, about 0.25 minute to 10 minutes, preferably 0.5 to 2 minutes, to a temperature of about 80–120° C. During the subsequent alkaline treatment, this lacquer top coating then remains in the image portions while it is dissolved away with the photoconductor coating from the image-free parts.

By this treatment, a still greater increase in the printing run can often be achieved.

The lacquers contain a solvent such as cyclohexane, cyclohexanone, methylethylketone, butyl acetate, decaline, tetraline, and amyl acetate, and mineral oils. They also contain a lacquer-former such as polyvinyl chloride, polyvinyl acetate, phthalic acid ester resins, interpolymers of styrene and maleic anhydride, polycarbonic ester resins, maleinate resins, alkyd resins, colophony resins and high-polymer polyacrylic acid or phenolformaldehyde resins. The lacquers also may contain a dyestuff that is soluble in organic solvents, e.g., those known as dispersion dyestuffs.

It may be an advantage for water-soluble silicates, such as sodium silicate, potassium silicate or mixed silicates, such as sodium-potassium silicates, which may also contain small quantities of calcium silicate, to be added to the alkaline liquids to increase the hydrophilic properties of the image-free non-printing areas on the printing plate.

Immediately after the treatment with alkaline liquid, the printing plate is advantageously rinsed down with water. Hydrophilic properties may be increased still more by wiping over with a dilute phosphoric acid solution. After the plate has been inked up with greasy ink, printing can be performed in the usual way.

Using the alkali-soluble, photoconductive reproduction coatings, and agents for the treatment of the coatings which are adapted thereto and contain alkaline compounds, printing plates which have excellent image quality and give a particularly long printing run are obtained. The process described has, moreover, the advantage that if metals such as aluminum are used as supporting material, these do not need to be pretreated by phosphating, silicating or chromating or by mechanical roughening, as is customary in other cases.

The invention will be further illustrated by reference to the following specific examples:

*Example 1*

30 parts by weight of 2,5-bis-(4'diethylaminophenyl-(1'))-1,3,4-triazole and 0.025 part by weight of Rhodamine B extra (Schultz' "Farbstofftabellen," 7th edition, volume I, 1931, No. 864) are dissolved in a mixture consisting of 150 parts by volume of ethyleneglycolmonomethylether and 150 parts by volume of toluene. This solution is applied in known manner to an aluminum foil consisting of bright, rolled aluminum that has been cleaned with trichloroethylene; it is then dried. For the production of images on the electrocopying material thus produced, the coating is negatively charged by a corona discharge and then exposed under a master for 4 seconds to the light of a 100-watt lamp at a distance of 25 cm. The electrostatic image of the master thereby produced is made visible by dusting over with a resin powder pigmented with carbon black and is fixed by heating to about 150° C. to give an electrocopy which is resistant to abrasion. In this way, an electrocopy corresponding to the master is obtained which is resistant to alkaline solutions in the image portions.

The resin powder used for development consists of a toner and carrier. The carriers used are generally tiny glass balls or iron powder. These, together with the toner, produce charging as a result of the tribo-electric effect, the toner taking on an opposite charge to that of the carrier. The toner consists of a polystyrene/colophony mixture of low melting point to which carbon black and, if desired, also spirit-soluble Nigrosine (Schultz, ibid., No. 985) are added. The components are melted together, and then ground. Since a uniform particle size is best for the preparation of images, the particles are then screened. A fraction containing particle sizes of from 20–50μ, preferably 5–30μ, is very satisfactory.

For the preparation of the printing surface, the image is wiped over with a solution of 1 percent of monoethanolamine in 99 percent of polyethylene glycol. After brief rinsing with water and inking up with greasy ink, the plate can be used in an offset printing machine in the usual manner.

*Example 2*

30 parts by weight of 2,5-bis-(4'-diethylaminophenyl-(1'))-1,3,4-oxadiazole and 30 parts by weight of p-diethylamino-benzoic acid are dissolved in 450 parts by volume of ethyleneglycolmonomethylether. This solution is coated upon a mechanically roughened aluminum foil and the coating is then dried. With the material thus prepared, electrocopies are produced in the manner described in Example 1.

For conversion to a printing surface, the image is wiper over with a solution containing 5 percent of monoethylamine, 5 percent of diethanolamine, 20 percent of glycerine, 65 percent of ethyleneglycol and 5 percent of sodium metasilicate, briefly rinsed down with water and inked up with greasy ink.

*Example 3*

For the preparation of a printing foil on a paper base, a paper foil, e.g., one prepared by the process described in U.S. Patent 2,681,617, is coated with a solution containing 10 parts by weight of 2,5-bis-(4'-toluene-sulfonamidophenyl-(1'))1,3,4-oxadiazole in 150 parts by volume of ethyleneglycolmonomethylether. After evaporation of the solvent, the coating adheres very firmly to the paper surface. Copies are prepared from this electrocopying material in the manner described in Example 1.

For conversion to a printing surface, the image is wiped over with a solution consisting of 2 percent of trisodium phosphate, 5 percent of sodium metasilicate and 1 percent of sodium hexametaphosphate in water, rinsed down with water and inked up with greasy ink.

2,5 - bis - (4'-toluene-sulfonamidophenyl-(1'))-1,3,4-oxadiazole, with a melting point of 190–192° C. and the formula

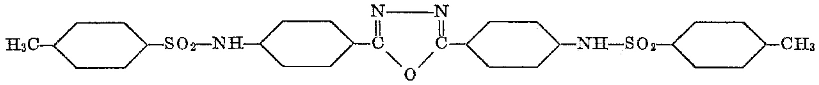

is obtained by the condensation of 2,5-bis-(4'-aminophenyl-(1'))-1,3,4-oxadiazole with p-toluene-sulfochloride. 25.2 parts by weight of 2,5-bis-(4'-aminophenyl-(1'))-1,3,4-oxadiazole are dissolved in 500 parts by volume of dioxane and to this solution 38 parts by weight of p-toluene-sulfochloride are added. With stirring, 30 parts by weight of sodium carbonate dissolved in 150 parts by volume of water are introduced dropwise at room temperature. The reaction mixture is stirred for 10 to 12 hours at room temperature, then heated for one hour to 100° C. and finally poured into 1000 parts by volume of water. The precipitate which then separates out is filtered by suction and then washed with water until a neutral reaction is obtained. It is recrystallized from 96 percent alcohol.

*Example 4*

A solution of 25 parts by weight of 2-(4-diethylaminophenyl)-4,5-diphenylimidazole, 12 parts by weight of purpurogallin and 0.002 part by weight of Victoria Blue B (Schultz, ibid., No. 822) in 300 parts by volume of benzene is prapared. This solution is coated upon an electrolytically roughened aluminum foil, which is then dried. Copies are prepared from this electrocopying material in the manner described in Example 1.

For conversion to a printing surface, the foil is wiped over with a solution consisting of 10 parts of concentrated ammonia and 90 parts of polyethylene glycol, rinsed down with water, wiped over with dilute phosphoric acid to increase hydrophilic properties and then inked up with greasy ink.

*Example 5*

5 parts by weight of 3-(4'-dimethylaminophenyl)-5-(4''-methoxyphenyl)-6-phenyl-1,2,4-triazine and 10 parts by weight of anthracene-1-sulfonanilide and 0.003 part by weight of Ethyl Violet (Schultz, ibid., No. 787) are dissolved in 100 parts by volume of ethyleneglycolmonomethylether and 50 parts by volume of methylethylketone. This solution is coated upon a mechanically roughened aluminum foil, which is then dried. An electrocopy is produced in the manner described in Example 1.

For conversion to a printing surface, the image is wiped over with a solution consisting of 25 percent of monoethanolamine and 75 percent of polyethylene glycol and then inked up with greasy ink.

Anthracene-1-sulfonanilide, with a melting point of 220–221° C. and the formula

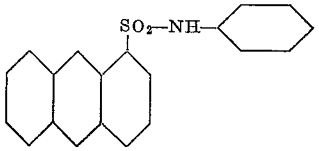

is prepared as follows:

13.8 parts by weight of anthracene-1-sulfochloride and 50 parts by volume of aniline are stirred together and allowed to stand overnight. The reaction product is poured into 1000 parts by volume of water and acidified with concentrated hydrochloric acid until it gives an acid reaction to Congo red. The precipitate which separates out is separated by suction filtration and then washed, first with water to which hydrochloric acid is added, and then with water alone. The compound is a yellow crystalline substance which can be purified by recrystallization from 90 percent alcohol or benzene.

*Example 6*

50 parts by weight of 2,5-bis-(4'-diethylaminophenyl-(1'))-1,3,4-oxadiazole and 10 parts by weight of 6-amino-2-(4-amino-styryl)-benzimidazole and 0.03 part by weight of Rhodamine B extra are dissolved in 300 parts by volume of benzene. The solution is applied to an aluminum foil consisting of bright, rolled aluminum and then dried. The electrocopying material thus prepared is negatively charged by a corona discharge and a leica diapositive is projected on the charged electrocopying material in a photographic enlarging apparatus with an illumination strength of 3 lux, the exposure time being one minute. The image is developed with a developer consisting of a toner and iron powder and fixed by a brief heating to 100–150° C.

For conversion to a printing surface, the image is wiped over with a solution containing 0.5 percent of monoethanolamine, 60 percent of glycerine and 39.5 percent of ethylene glycol. It is then inked up with greasy ink.

*Example 7*

10 parts by weight of 2,5-bis-(4'-di-n-propylamino-phenyl-(1'))-1,3,4-triazole and 0.005 part by weight of Acid Violet 6 BN (Schultz, ibid., No. 831) are dissolved in 150 parts by volume of ethyleneglycolmonomethylether. The solution is coated upon a mechanically roughened aluminum foil and then dried. The electrocopying material thus prepared is negatively charged by a corona discharge and then given an exposure of about 20–60 seconds, at stop 9 in the cassette of a document camera in which there is a reversal prism. The illumination used consists of four 30-amp. carbon arc lamps.

The master used is a line drawing with printing on the back. The electrostatic image thus produced is developed by dusting over with a resin powder, as described in Example 1, whereupon a correct, unreversed image becomes visible. It is fixed by treatment with trichloroethylene vapor.

For conversion to a printing surface, the image is wiped over with a solution consisting of 25 percent diethanolamine and 75 percent of polyethylene glycol and inked up with greasy ink.

*Example 8*

The procedure described in Example 1 is followed, but a solution consisting of 3 parts by weight of 2,5-bis-(4'-monoethylaminophenyl-(1'))-1,3,4-oxadiazole and 1 part by weight of tetrachlorophthalic acid in 30 parts by volume of methylethylketone and 30 parts by volume of ethyleneglycolmonomethylether is used to coat a mechanically roughened aluminum foil. After the coating has been dried, it is negatively charged by corona discharge and a positive copy is developed as described in Example 1.

For conversion to a printing surface, the image is wiped over with a solution consisting of 5 percent of octylamine and 95 percent of polyethylene glycol. It is rinsed down with water, briefly treated with dilute phosphoric acid and inked up with greasy ink.

*Example 9*

30 parts by weight of 2,5-bis-(4'-diethylaminophenyl-(1'))-1,3,4-oxadiazole and 8 parts by weight of purpurogallin are dissolved in 350 parts by volume of ethyleneglycolmonomethylether. The solution is applied to an aluminum foil consisting of bright, rolled aluminum. After evaporation of the solvent, a coating remains which adheres firmly to the surface of the foil; further procedure is as described in Example 1. A positive image is obtained on the aluminum foil when the electrophotographically produced image, after being powdered over with resin, is fixed by heating or treated with trichloroethylene vapor. The aluminum foil provided with the image can be converted into a printing plate if wiped over with a solution consisting of 10 percent of monoethanolamine and 90 percent of polyglycol. After the surface has been rinsed down with water and briefly treated with dilute phosphoric acid to increase the hydrophilic properties thereof, it is inked up with greasy ink.

*Example 10*

2.5 parts by weight of 2,5-bis(4'-di-n-propylamino-phenyl-(1'))-1,3,4-triazole are dissolved in 30 parts by volume of benzene and the solution is applied to an aluminum foil consisting of bright, rolled aluminum and dried. On the coated aluminum foil, images with good contrast effect are produced by the electrophotographic process. The aluminum foil provided with an image, after being fixed by heating, can be converted into a printing plate. It is wiped over with a solution consisting of 5 percent of morpholine and 95 percent of polyglycol. After being rinsed with water, it is inked up with greasy ink.

*Example 11*

The procedure described in Example 1 is followed, but 8 parts by weight of 2,5-bis-(4'-diethylaminophenyl-(1'))-1,3,4-triazole and 0.03 part by weight of Rhodamine B extra in a mixture consisting of 80 parts by volume of ethylene glycol monomethylether and 20 parts by volume of toluene are used for the coating of an aluminum foil consisting of bright, rolled aluminum. After the coating has been dried, it is positively charged by corona discharge and a leica diapositive is projected on the charged electrocopying material in a photographic enlarging apparatus with an illumination intensity of 3 lux. An exposure time of 1 minute is used. Development is effected with a developer consisting of a negatively charged toner and iron powder by means of a bar magnet. The image is fixed by heating to 150° C. A positive enlargement is obtained.

The negatively charged toner used may, for example, be an interpolymer consisting of 85 percent of vinyl chloride, 14 percent of vinyl acetate and 1 percent of maleic acid ("Hostalit CAM"), pigmented with a dispersion dyestuff such as Cellitone Fast Black BTN.

For conversion of the image into a printing surface, the entire image side of the foil is treated uniformly with a lacquer of the following composition: 11.5 parts by volume of amyl acetate, 25 parts by volume of paraffin oil, 3.5 parts by volume of cyclohexane, 10 parts by weight of a drying alkyd resin, with a castor oil base and an acid number of 10, and 1.5 parts by weight of a pigment dyestuff which is a commercially available under the trade name "Sudanrot BK." The foil is then placed for about 1 minute in a drying oven at a temperature of 100° C. It is wiped over with a solution containing 94.5 percent of ethylene glycol, 0.5 percent of monoethanolamine and 5 percent of sodium metasilicate until the coating is dissolved away in the image-free portions. The image portions are not attacked and, being colored red, are clearly visible. After being inked up with greasy ink, the plate can be used in a printing machine in the usual manner.

*Example 12*

5 parts by weight of 2,5-bis-(4'-diethylaminophenyl-(1'))-1,3,4-triazole are dissolved in a solvent mixture consisting of 30 parts by volume of ethylene-glycolmonomethylether and 20 parts by volume of benzene. The solution is applied to an aluminum foil consisting of bright, rolled aluminum and is dried. After being dried, the coating is negatively charged by a corona discharge and an enlargement from a negative microfilm is projected thereon by means of a projection apparatus. The latent enlarged image thus formed is treated with a developer consisting of a negatively charged toner and iron powder. A positive enlargement is obtained.

For the preparation of the negatively charged toner, 10 parts by weight of a partially saponified resin consisting of 91 percent of vinyl chloride, 3 percent of vinyl acetate and 6 percent of saponified vinyl acetate ("Vinylite VAGH") are introduced at 40° C. into about 200 parts by weight of water in which 1.2 parts by weight of Cibacete Black PS (Colour Index, vol. 1, p. 1738) and as "Carrier" 1.2 parts by weight of phenyl-ethyl-urethane ("Remol Pe-Ce") have been suspended. The mixture is stirred for 3 hours at 65° C. After drying, black pigmented powder is obtained. This toner is mixed with iron powder in the ratio of 1:100. The toner adheres to the portions of the coating that have been struck by light and a reversed image of the master is obtained, e.g., a positive from a negative.

For the conversion of the image into a printing surface, the entire image side of the foil is uniformly treated with a lacquer of the following composition: 5 parts by volume of amyl acetate, 3.5 parts by volume of tetraline, 25 parts by volume of paraffin oil, 15 parts by volume of butyl acetate, 5 parts by weight of a non-hardening phenol resin of the novolak type and 1.5 parts by weight of a pigment dyestuff which is commercially available under the trade name "Sudanrot BK." After through drying (1 min. at 100° C.) the plate is treated with a solution containing 94 percent of ethylene glycol, 1 percent of monoethanolamine and 5 percent of sodium metasilicate, as described in Example 11. After the soil thus obtained has been inked up with greasy printing ink, it can be used for printing in the usual manner.

*Example 13*

5 parts by weight of 2-(β-(_4-dimethylaminostyrene))-6-methyl-4-pyridone, 5 parts by weight of a maleinate resin (Beckacite K 105), 1.5 parts by weight of 4-dimethylaminobenzoic acid, and 0.005 part by weight of Astraphloxin (Schultz, ibid., No. 930), are dissolved in 100 parts by volume of toluene. This solution is coated in known manner onto an aluminum foil consisting of bright, otherwise untreated rolled aluminum, and then dried. For the preparation of images on the electrophotographic material thus obtained the layer is negatively charged by means of corona discharge and then exposed under a positive transparent master by means of a 100 watt incandescent lamp. The time of exposure is 0.5 seconds. The electrostatic image of the master thus produced is made visible by dusting over with a resin powder pigmented by carbon black and then fixed by heating to 180° C. Thus an electrophotographic image corresponding to the master is obtained which is resistant to abrasion.

For conversion to a printing plate, the electrophotographic image is treated with a solution containing 5 parts by weight of sodium silicate and 2 parts by weight of monoethanol amine per 100 parts by volume of water. After briefly rinsing with water and inking up with greasy ink, the printing plate obtained may be used for printing in an offset apparatus.

*Example 14*

3 parts by weight of 2-(4-'-dimethylaminophenyl)-4,5-diphenyl-imidazole, 3 parts by weight of anthracene-1-sulfanilide, 3 parts by weight of 2,5-bis-[4'-diethylaminophenyl-(1')]-1,3,4-triazole, 3 parts by weight of an after-chlorinated polyvinyl chloride, 3 parts by weight of 4-diethylmanobenzoic acid, and 0.007 part by weight of Rhodamine B extra (Schultz, ibid., No. 864) are dissolved in a mixture consisting of 80 parts by volume of methyl ethyl ketone and 20 parts by volume of toluene The solution thus obtained is coated onto an aluminum foil which had been roughened by brushing, and then dried. By means of the electrophotographic material thus produced, electrophotographic images are prepared in the manner described in Example 13. For conversion to a printing plate, the electrophotographic image is treated with a solution consisting of 5% of monoethanol amine, 5% of diethanol amine, 30% of triglycol, and 60% of methyl alcohol. Subsequently, the plate is briefly rinsed with water and treated with dilute aqueous phosphoric acid (approx. 0.5 to 5%). After inking with greasy ink, the printing plate thus obtained may be used for printing in an offset machine.

*Example 15*

For the preparation of a printing plate on a paper base, a paper foil manufactured, e.g. in accordance with U.S. patent specification No. 2,681,617 is coated with a solution containing 5 parts by weight of polyvinyl carbazole, 3 parts by weight of 4-ethylpropylamino benzoic acid and 0.002 part by weight of Victoria Pure Blue (Schultz, ibid., No. 822) in a mixture consisting of 80 parts by volume of toluene and 20 parts by volume of dimethyl formamide. After evaporation of the solvent the layer adheres very firmly to the paper surface. By means of the electrophotographic material thus prepared, copies are produced by the method described in Example 13.

For conversion into a printing plate, the copies are treated with a solution consisting of 5 parts by volume of monoethanol amine, 15 parts by volume of glycerine, 10 parts by volume of glycol and 70 parts by volume of a 5% aqueous solution of sodium silicate. A printing plate is thus obtained which, after rinsing with water and inking with greasy ink, may be used for making prints.

*Example 16*

4 parts by weight of 2,5-bis-[4'-diethylaminophenyl-(1')]-1,3,4-oxadiazole, 3 parts by weight of a ketone resin (AP-Harz), 3 parts by weight of a coumarone resin (Cumaronharz B 1/85), 2 parts by weight of 3-aminobenzoic acid, and 0.004 part by weight of Eosin S (Schultz, ibid., No. 883) are dissolved in a solvent mixture consisting of 80 parts by volume of toluene, 20 parts by volume of dimethyl formamide, and 2 parts by volume of ethyleneglycol monomethyl ether. This solution is coated onto a paper foil laminated with a thin aluminum foil and dried. From the electrophotographic material thus produced copies are prepared by the method described in Example 13.

For conversion to a printing plate, the developed material is wiped over with a very dilute aqueous sodium hydroxide solution, briefly rinsed with water, treated with 1 percent phosphoric acid, and finally inked up with greasy ink. A printing plate is thus obtained which yields very good prints when used in a printing apparatus.

*Example 17*

Four parts by weight of 2,5-bis-[4′-diethylaminophenyl-(1′)]-1,3,4-oxadiazole, 4 parts by weight of a phenol resin (Alnovol 429 K), 0.75 part by weight of 4-monoethylamino benzoic acid, and 0.001 part by weight of Methyl Violet (Schultz, ibid., No. 822), are dissolved in 100 parts by volume of methyl ethyl ketone, and the solution thus obtained is coated onto a mechanically roughened aluminum foil and dried. For the production of images on the electrophotographic material thus obtained, the layer is positively charged by means of a corona discharge and then exposed for 1 second under a master to the light of a 100 watt incandescent bulb. The electrostatic image of the master thus obtained is then developed in the manner described in Example 13. A reversed image of the master used is thus obtained, which is fixed by heating to 160° C.

For conversion to a printing plate, the image side of the foil is wiped over with a 10 percent solution of octyl amine in polyethylene glycol. By this alkaline solution, the image-free parts of the layer are removed. After a brief rinsing with water and treatment with dilute aqueous phosphoric acid solution (approx. 3%), the printing plate obtained may be inked up with greasy ink and used for printing in a customary offset apparatus.

*Example 18*

In 150 parts by volume of toluene and 15 parts by volume of dimethyl formamide there are dissolved 9.75 parts by weight of polyvinyl carbazole, 9.75 parts by weight of 2,5-bis-[4′-diethylaminophenyl-(1′)]-1,3,4-triazole and 4.5 parts by weight of 4-dipropylamino-benzoic acid. Into this solution, there is introduced a solution consisting of 0.045 part by weight of Crystal Violet (Schultiz ibid., No. 785) and 0.045 part by weight of Astraphloxin (Schultz ibid., No. 930), dissolved in 5 parts by volume of methanol. The solution is coated onto a mechanically roughened aluminum foil and dried. The electrophotographic material thus produced is negatively charged by means of a corona discharge and then a photographic diapositive is projected, in a photographic enlarging apparatus, onto the charged electrophotographic material for 1 minute with an illumination intensity of 3 lux. Subsequently, the foil is developed by means of a resin powder and fixed by heating to 160° C. for 30 seconds.

For conversion into a printing plate, the foil is treated with a solution consisting of 55 parts by volume of ethyl alcohol, 25 parts by volume of triglycol, and 20 parts by volume of triethanol amine. After rinsing with water and treatment with dilute phosphoric acid in order to increase the hydrophilic properties of the areas not struck by light, the foil may be inked with greasy ink and used for printing.

*Example 19*

100 parts by weight of 2,5-bis-[4′-diethylaminophenyl-(1′)]-1,3,4-oxadiazole, 100 parts by weight of a chlorinated caoutchouc having a viscosity of 80 to 115 [centipoises in a 20 percent toluene/butanol solution (95:5)], and 40 parts by weight of 4-diethylamino benzoic acid are dissolved in 2000 parts by volume of ethylene glycol monomethyl ether. 0.2 part by weight of Rhodamine B extra (Schultz, ibid., No. 864), dissolved in 20 parts by volume of methanol, are added to the solution, which is then mechanically coated onto a foil of bright, rolled aluminum and dried. The electrophotographic material thus produced is negatively charged by means of a corona discharge and then exposed, at stop 9, for about 20–40 seconds, depending on the scale of reproduction, in the cassette of a document camera provided with a reversal prism. The light source used consists of 6 nitrophot lamps of 500 watts each.

The master used is a line drawing with printing on the back. The electrostatic image thus obtained is developed. by dusting over with a resin powder. A non-reversed image of the master becomes visible and is then fixed by heating to about 160° C.

For conversion to a printing plate, the image is treated with a solution consisting of 5 parts by volume of sodium silicate, 2 parts by volume of monoethanol amine, and 93 parts by volume of water. After rinsing the printing plate with water and inking with greasy ink, it may be used for printing.

Alternatively, the solution described above may be used for coating a copper foil laminated onto a Pertinax plate or for coating a Pertinax plate onto which copper has been vacuum deposited, and the plates thus obtained may be converted to so called printed wirings by the following method:

A Pertinax plate which had been vacuum deposited with a copper layer is coated on this layer with the photoconductor solution described and then dried. Subsequently, the electrophotographic material is negatively charged by corona discharge and then exposed in contact with a master showing a wiring scheme. Development is effected by means of a resin powder, followed by a treatment with trichloro ethylene vapours for fixing of the image. For conversion of the image to an electrically conductive wiring scheme, the layer is first removed from the image-free areas by means of a solution containing 5 parts by volume of sodium silicate, 2 parts by volume of monoethanol amine, 1 part by volume of trisodium phosphate, and 92 parts by volume of water. Subsequently, the bared copper layer is etched for 25 minutes with an irontrichloride solution of 40° Bé. The plate is then rinsed with water and dried. Subsequently, on the image parts the copper is bared by means of an organic solvent, e.g. acetic acid ethyl ester, and a copper wiring scheme is thus obtained on the Pertinax plate.

It will be obvious to those skilled in the art that many modifications may be made within the scope of the present invention without departing from the spirit thereof, and the invention includes all such modifications.

What is claimed is:

1. A process for preparing a printing plate which comprises exposing a charged, supported, photoconductive insulating layer comprising a member selected from the group consisting of an alkali-soluble organic photoconductor and an alkali-insoluble organic photoconductor in admixture with at least one alkali-soluble compound selected from the group consisting of aromatic carbocyclic and aromatic heterocyclic compounds, to light under a master, developing and fixing the resulting image, and treating the exposed layer with an alkaline liquid having a hydroxyl ion concentration substantially greater than $10^{-7}$ moles per liter.

2. A process according to claim 1 in which the photoconductive insulating layer comprises a mixture of an alkali-insoluble organic photoconductor, an alkali-soluble organic photoconductor, and an alkali-soluble compound selected from the group consisting of aromatic carbocyclic and aromatic heterocyclic compounds.

3. A process according to claim 1 in which the photoconductive insulating layer includes a resin.

4. A process according to claim 1 in which the photoconductive insulating layer includes a dyestuff sensitizer.

5. A process according to claim 1 in which the alkaline liquid is an aqueous liquid.

6. A process according to claim 1 in which the alkaline liquid is an aqueous liquid containing an organic solvent.

7. A process according to claim 1 in which the alkaline liquid is selected from the group consisting of saturated amines, amino alcohols and aqueous ammonia solutions.

8. A process according to claim 1 in which the support for the photoconductive insulating layer is aluminum.

9. A process according to claim 1 in which the photoconductive insulating layer comprises 2,5-bis-(4′-diethylaminophenyl)-(1′))-1,3,4-triazole.

10. A process according to claim 1 in which the photoconductive insulating layer comprises 2,5-bis-(4′-diethylaminophenyl-(1′))-1,3,4-oxadiazole and p-diethylaminobenzoic acid.

11. A process according to claim 1 in which the photoconductive insulating layer comprises 2,5-bis-(4′-toluenesulfonamidophenyl-(1′))-1,3,4-oxadiazole.

12. A process according to claim 1 in which the photoconductive insulating layer comprises 2-(4-diethylaminophenyl)-4,5-diphenyl-imidazole and purpurogallin.

13. A process according to claim 1 in which the photoconductive insulating layer comprises 3-(4′-dimethylaminophenyl) - 5-(4″-methoxyphenyl)-6-phenyl-1,2,4-triazine and athracene-1-sulfonanilide.

14. A process according to claim 1 in which the photoconductive insulating layer comprises 2,5-bis-(4′-diethylaminophenyl-(1′))-1,3,4-oxadiazole and 6-amino-2-(4-aminostyryl)-benzimidazole.

15. A process according to claim 1 in which the photoconductive insulating layer comprises 2,5-bis-(4′-di-n-propylamino-phenyl-(1′))-1,3,4-triazole.

16. A process according to claim 1 in which the photoconductive insulating layer comprises 2,5-bis-(4′-monoethylaminophenyl-(1′))-1,3,4-oxadiazole and tetrachlorophthalic acid.

17. A process according to claim 1 in which the photoconductive insulating layer comprises 2,5-bis-(4′-diethylaminophenyl-(1′))-1,3,4-oxadiazole and purpurogallin.

18. A process according to claim 3 in which the photoconductive insulating layer comprises 2-(β-(4-dimethylaminostyrene)) - 6-methyl-4-pyridone and 4-dimethylamino benzoic acid.

19. A process according to claim 3 in which the photoconductive insulating layer comprises 2-(4′-dimethylaminophenyl)-4,5-diphenyl-imidazole, anthracene-1-sulfanilide, 2,5 - bis-(4′-diethylaminophenyl-(1′))-1,3,4,-triazole, and 4-diethylamino benzoic acid.

20. A process according to claim 3 in which the photoconductive insulating layer comprises polyvinyl carbazole and 4-ethylpropylamino benzoic acid.

21. A process according to claim 3 in which the photoconductive insulating layer comprises 2,5-bis-(4′-diethylaminophenyl-(1′))-1,3,4-oxadizole and 3-aminobenzoic acid.

22. A process according to claim 3 in which the photoconductive insulating layer comprises 2,5-bis-(4′-diethylaminophenyl-(1′))-1,3,4-oxadizole and 4-monoethylamino benzoic acid.

23. A process according to claim 3 in which the photoconductive insulating layer comprises polyvinyl carbazole, 2,5-bis-(4′-diethylaminophenyl-(1′))-1,3,4-triazole, and 4-dipropylamino-benzoic acid.

24. A process according to claim 3 in which the photoconductive insulating layer comprises 2,5-bis-(4′-diethylaminophenyl-(1′))-1,3,4-oxadiazole and 4-diethylamino benzoic acid.

References Cited by the Examiner

UNITED STATES PATENTS

| | | | |
|---|---|---|---|
| 2,857,271 | 10/1958 | Sugarman | 96—1 |
| 2,857,272 | 10/1958 | Grieg | 96—1 |
| 2,939,787 | 6/1960 | Giaimo | 96—1 |
| 2,946,682 | 7/1960 | Lauriello | 96—1 |
| 2,957,765 | 10/1960 | Resetich | 96—33 |
| 3,037,861 | 6/1962 | Hoegl et al. | 96—1 |
| 3,072,479 | 1/1963 | Bethe | 96—1 |

FOREIGN PATENTS

| | | |
|---|---|---|
| 203,907 | 11/1956 | Australia. |
| 210,374 | 9/1957 | Australia. |
| 558,078 | 12/1957 | Belgium. |
| 562,336 | 5/1958 | Belgium. |
| 1,177,936 | 12/1956 | France. |

NORMAN G. TORCHIN, *Primary Examiner.*

PHILIP E. MANGAN, *Examiner.*